United States Patent Office 3,422,129
Patented Jan. 14, 1969

3,422,129
PREPARATION OF LITHIOFERROCENES
Harold Rosenberg, Dayton, Ohio, assignor to the United States of America as represented by the Secretary of the Air Force
No Drawing. Filed Aug. 31, 1966, Ser. No. 576,778
U.S. Cl. 260—439  2 Claims
Int. Cl. C07f 15/02

ABSTRACT OF THE DISCLOSURE

A new method for preparing relatively pure mono- and di-lithioferrocene comprising the steps of converting monochloromercuriferrocene and 1,1'-dichloromercuriferrocene to the corresponding monobromoferrocene and 1,1'-dibromoferrocene, respectively, with N-bromosuccinimide and thereafter reacting the resulting bromoferrocenes with n-butyllithium to form monolithium ferrocene and 1,1'-dilithioferrocene, respectively. The resulting compounds are useful as reactive intermediates in preparing other ferrocene compounds such as polymers.

---

The invention described herein may be manufactured and used by or for the United States Government for governmental purposes without the payment to me of any royalty thereon.

This invention deals with the preparation of pure monolithioferrocene and pure 1,1'-dilithioferrocene and, more specifically, deals with a method of preparing these compounds from chloromercuriferrocene and 1,1' - bis (chloromercuri)ferrocene, respectively.

It is well known that ferrocene can be reacted with an excess of n-butyllithium to give fair yields of a mixture of monolithioferrocene and 1,1'-dilithioferrocene. Similarly, it is known that restriction of the concentration of the n-butyl-lithium to the stoichiometric proportion for the production of the mono compound results in yields of up to about 26 percent of the mono compound in the presence of considerable unreacted n-butyllithium. Thus, each of these reactions results in the production of the lithioferrocene product in the presence of another difficultly-separable and reactive material.

A method of obtaining the mono- and 1,1'-dilithioferrocenes separately from each other has been suggested by Seyferth et al (Inorg. Chem., 1, 227, 1962) and involves reacting ferrocene with mercuric chloride to form a mixture of choloromercuriferrocene and 1,1'-bis(chloromercuri)ferrocene; then separating these two organo mercury compounds; and then reacting n-butyl-lithium with each of the separated mercury compounds. Although this method is successful in separating the mono- and dilithioferrocenes from each other, it still produces lithioferrocenes in the presence of another difficultly-separable and reactive compound; that is, di-n-butylmercury.

Proper exploitation of the potential uses of either monolithioferrocene or 1,1'-dilithioferrocene, therefore, has been held up because of the presence of large quantities of other reactive compounds in their synthesis. These reactive impurities take part in undesirable side reactions. In the preparation of polymers from 1,1'-dilithioferrocene, for example, compounds such as n-butyllithium and di-n-butylmercury take part in undesirable chain transfer or termination reactions. Di-n-butylmercury is also a very toxic compound and is avoided by those skilled in the art if it is at all possible to do so.

OBJECTS

It is therefore an object of this invention to provide a method for the preparation of pure monolithioferrocene.

It is a further object to provide a method for the preparation of pure 1,1'-dilithioferrocene.

It is a specific object of the invention to provide for the production of pure monolithioferrocene in the substantial absence of another reactive material.

It is also a specific object of the invention to provide for the production of pure 1,1'-dilithioferrocene in the substantial absence of another reactive material.

It is a further object to provide a method for the replacement of bromine with lithium in mono- or 1,1'-dibromoferrocene to make mono- or 1,1'-dilithioferrocene, respectively, in the substantial absence of other reactive materials.

I have now found that the foregoing and related objects can be attained in the method of preparing at least one relatively pure member of the group consisting of monolithioferrocene and 1,1'-dilithioferrocene; wherein, in said method, ferrocene is converted to a mixture of monochloromercuriferrocene and 1,1'-bis(chloromercuri) ferrocene and wherein said two latter choloromercuri compounds are separated from each other; by including in said method the improvement which comprises the steps of (1) effecting the replacement of said chloromercuri groups with bromine atoms in at least one of said separated chloromercuri compounds and (2) then effecting the replacement of said bromine atoms with lithium.

The preparation of pure monolithioferrocene by the method of the invention involves a selected sequence of known reactions to produce a pure monobromoferrocene and then the replacement of bromine by lithium under conditions which do not result in the presence of an undue proportion of reactive compounds. Thus one can react ferrocene with a large excess of mercuric chloride to obtain a mixture of mono- and 1,1'-bis(chloromercuri) ferrocenes. This latter mixture can then be separated into a fraction containing monochloromercuriferrocene and a fraction containing 1,1'-bis(chloromercuri)ferrocene. Each of the foregoing steps—from ferrocene to the separation of the mono- and bis(chloromercuri)ferrocenes—is known in the art.

The monochloromercuriferrocene may be then reacted with N-bromosuccinimide, for example, to effect the replacement of the chloromercuri group with bromine to make monobromoferrocene, the latter being freed of mercury-containing impurities. This replacement to make monobromoferrocene is also known in the art (Fish and Rosenblum, J. Org. Chem. 30, 1253, 1965). The monobromoferrocene, having been made by the foregoing selected sequence of individually known reactions, then becomes the starting material for the preparation of the desired monolithioferrocene and I have discovered a method by which this can be done. This latter method will be discussed hereinafter.

The preparation of pure 1,1'-dilithioferrocene by the method of the invention follows the same pathway as outlined for monolithioferrocene except that the 1,1'-bis (chloromercuri)ferrocene fraction is selected for subsequent treatment to form 1,1'-dibromoferrocene, the latter becoming the starting material for the preparation of the desired 1,1'-dilithioferrocene.

A lithioferrocene can be prepared from the corresponding bromoferrocene as follows:

A three-neck round bottom flask is fitted with a nitrogen inlet tube, a thermometer, and a rubber serum cap. Provision is made for magnetic stirring. A quantity of a bromoferrocene is added to the flask via a powder funnel and against a stream of nitrogen. The required volume of tetrahydrofuran solvent is then added and the mixture is stirred at high speed and cooled to the reaction temperature in a cooling bath, the reaction temperature being in the range of about −80° C. to about 10° C. The required volume of n-butyllithium in hexane is then added through the serum cap from a hypodermic syringe. An excess of n-butyllithium in the range of 0–10 percent excess is usually used (or an approximate stoichiometric proportion). Periodic samples of the reaction mixture can be withdrawn for analysis of the lithioferrocene being prepared. When the reaction is complete (in about 2–45 minutes) an aliquot portion of the product can be carbonated to form the corresponding ferrocene-carboxylic acid for purposes of identification. The acid derivative can be prepared as follows:

The size of aliquot taken is usually sufficiently large to yield about 0.1–0.5 gram of the carboxylic acid after carbonation. The aliquot sample is run directly into about 200 ml. of freshly crushed Dry Ice wetted with dry ether. The mixture is allowed to reach room temperature during which time the solvent evaporates off. The product is taken up in about 20 ml. of distilled water which is then filtered and washed. The filtrate and washings are acidified to a pH of 2 with 10 percent hydrochloric acid solution which effects the precipitation of the ferrocene-carboxylic acid. The latter is filtered in a tared filter crucible and is dried to a constant weight in vacuo at 60° C. The quantity of mono- or lithioferrocene, as the case may be, in the original reaction mixture can be calculated from the weight of carboxylic acid derivative obtained (with correction for its solubility in the hydrochloric acid solution). For purposes of identification, the acid derivative can be subjected to infrared spectral analysis and, further, its acid equivalent can be determined. The foregoing reaction conditions give a yield of about 65–76 percent for monolithioferrocene and about 97–100 percent for dilithioferrocene from the respective bromo derivatives.

Example 1

Monobromoferrocene was prepared by (1) reacting ferrocene with an excess of mercuric chloride to make a mixture of chloro-mercuriferrocene and 1,1'-bis(chloromercuri)ferrocene, (2) separating monochloromercuriferrocene from the resulting mixture, (3) and effecting the replacement of the chloromercuri group with a bromide group. A prior art method was used in each of said steps. A portion of the monobromoferrocene (0.0100 mole) was dissolved in 20 ml. of tetrahydrofuran under nitrogen and the solution was cooled to $-78°$ C. While the solution was being stirred n-butyllithium (0.0110 mole), dissolved in hexane (17.5 ml.), was added from a syringe. After a reaction period of 45 minutes an aliquot of the reaction mixture was taken and the monolithioferrocene therein was converted to ferrocene-carboxylic acid for identification purposes as outlined above. A yield of 76 percent monolithioferrocene was obtained. I do not usually separate the monolithioferrocene product from the reaction mixture for the reason that the latter mixture provides an excellent vehicle for monolithioferrocene in most, if not all, the reactions in which it is used. However, if one wishes to separate out the monolithioferrocene, this can be done by cooling the reaction mixture to $-80°$ C. or lower and filtering out the insoluble lithioferrocene under nitrogen. The small residue of n-butylithium, which may be present, remains in solution.

Example 2

This example is similar to Example 1 except that 1,1'-dibromoferrocene was used instead of the monobromoferrocene. The dibromoferrocene (0.025 mole) was dissolved in 20 ml. of tetrahydrofuran under nitrogen and the solution was cooled to 0° C. While the solution was being stirred, n-butyllithium (0.0565 mole) in 36 ml. of hexane was added from a syringe. After a reaction period of 12 minutes an aliquot was taken for carbonation and identification as previously described. A yield of 97 percent of 1,1'-dilithioferrocene was obtained. As in the case with monolithioferrocene, I do not usually separate the 1,1'-dilithioferrocene from the reaction mixture. However, it can be precipitated out by cooling the reaction mixture if such separation is desirable.

It is to be understood that the foregoing examples and description are for the purpose of illustration only and that various changes may be made therein without departing from the spirit and scope of the invention.

I claim:
1. The method of preparing at least one relatively pure member of the group consisting of monolithioferrocene and 1,1'-dilithioferrocene comprising the steps:
   (1) converting ferrocene to monochloromercuriferrocene and 1,1'- dichloromercuriferrocene and separating the two compounds;
   (2) reacting each of said chloromercuriferrocenes with N-bromosuccinimide to replace the chlorine of the chloromercuri group with bromine to obtain monobromoferrocene where the starting compound is monochloromercuriferrocene and 1,1'-dibromoferrocene where the starting compound is 1,1'-dichloromercuriferrocene; and
   (3) reacting the resulting monobromoferrocene and 1,1'-dibromoferrocene with an approximately stoichiometric proportion of n-butyllithium in a solvent medium at a temperature between about $-80°$C. and about 10° C. to form monolithiumferrocene where the starting compound is monobromoferrocene and to form 1,1'-dilithioferrocene where the starting compound is 1,1'-dibromoferrocene.
2. The method according to claim 1 wherein the solvent medium is tetrahydrofuran-hexane.

References Cited

Shecther et al.: J. Org. Chem. 26 (1961), pp. 1034–1037.

Seyferth et al.: Inorg. Chem. 1 (1962), pp. 227–231.

Rausch: Canadian J. Chem. 41 (1963), p. 1303.

Chem. Abst. 63 (4331). Abstract of Fish et al., J. Org. Chem. 30, pp. 1253–1254.

TOBIAS E. LEVOW, *Primary Examiner.*

A. P. DEMERS, *Assistant Examiner.*

U.S. Cl. X.R.

260—431, 432, 514, 665.